(12) United States Patent
Yu et al.

(10) Patent No.: US 11,933,919 B2
(45) Date of Patent: Mar. 19, 2024

(54) SYSTEMS AND METHODS FOR SYNTHESIS OF MODULATED RF SIGNALS

(71) Applicant: Mixed-Signal Devices Inc., Irvine, CA (US)

(72) Inventors: Tommy Yu, Orange, CA (US);
Avanindra Madisetti, Coto De Caza, CA (US)

(73) Assignee: Mixed-Signal Devices Inc., Irvine, CA (US)

( * ) Notice: Subject to any disclaimer, the term of this patent is extended or adjusted under 35 U.S.C. 154(b) by 127 days.

(21) Appl. No.: 17/652,382

(22) Filed: Feb. 24, 2022

(65) Prior Publication Data
US 2023/0266448 A1   Aug. 24, 2023

(51) Int. Cl.
*H04L 5/00* (2006.01)
*G01S 7/35* (2006.01)
*G01S 7/4911* (2020.01)
*G01S 13/34* (2006.01)

(52) U.S. Cl.
CPC .......... *G01S 7/4911* (2013.01); *G01S 7/35* (2013.01); *G01S 13/34* (2013.01); *H04L 5/0007* (2013.01)

(58) Field of Classification Search
CPC .......... G01S 13/34; G01S 7/35; G01S 7/4911; H04L 5/0007
See application file for complete search history.

(56) References Cited

U.S. PATENT DOCUMENTS

| | | | |
|---|---|---|---|
| 5,682,161 | A | 10/1997 | Ribner et al. |
| 5,889,443 | A | 3/1999 | Joergensen |
| 5,914,933 | A | 6/1999 | Cimini et al. |
| 6,724,249 | B1 | 4/2004 | Nilsson |

(Continued)

FOREIGN PATENT DOCUMENTS

| | | |
|---|---|---|
| CN | 110168930 A | 8/2019 |
| EP | 3542461 A1 | 9/2019 |

(Continued)

OTHER PUBLICATIONS

Extended European Search Report for European Application No. 17872454.8, Search completed May 25, 2020, dated Jun. 4, 2020, 15 Pgs.

(Continued)

*Primary Examiner* — Rahel Guarino
(74) *Attorney, Agent, or Firm* — KPPB LLP

(57) ABSTRACT

Systems and methods for synthesis of a modulated RF signal using a variety of modulation schemes are described. An embodiment includes a direct frequency synthesizer with frequency modulated continuous wave (FMCW) modulation that includes: a high speed BAW resonator that generates a frequency signal; a BAW oscillator that receives the frequency signal and generates an output BAW clock signal (BAW CLK); a frequency and phase estimation circuit that receives a reference clock signal from a reference clock (REF CLK) and the BAW CLK and generates a frequency error and a phase error; a frequency chirp generator that receives chirp parameters, a chirp sync signal and generates a nominal frequency control word (FCW); and a high speed digital to analog converter (HS DAC) that receives the BAW CLK and the codeword and outputs an analog signal.

14 Claims, 11 Drawing Sheets

(56) References Cited

U.S. PATENT DOCUMENTS

| | | |
|---|---|---|
| 7,176,820 B1 | 2/2007 | Fuller et al. |
| 8,294,605 B1 | 10/2012 | Pagnanelli |
| 8,949,699 B1 | 2/2015 | Gustlin |
| 10,020,818 B1 | 7/2018 | Yu et al. |
| 10,367,522 B2 | 7/2019 | Yu et al. |
| 10,530,372 B1 | 1/2020 | Yu et al. |
| 10,812,087 B2 | 10/2020 | Yu et al. |
| 10,840,939 B2 | 11/2020 | Yu et al. |
| 11,258,448 B2 | 2/2022 | Yu et al. |
| 2001/0022555 A1 | 9/2001 | Lee et al. |
| 2002/0053986 A1 | 5/2002 | Brooks et al. |
| 2002/0057214 A1 | 5/2002 | Brooks et al. |
| 2002/0061086 A1 | 5/2002 | Adachi et al. |
| 2002/0093442 A1 | 7/2002 | Gupta et al. |
| 2003/0128143 A1 | 7/2003 | Yap et al. |
| 2003/0137359 A1 | 7/2003 | Patana et al. |
| 2003/0174080 A1 | 9/2003 | Brooks et al. |
| 2003/0179121 A1 | 9/2003 | Gupta et al. |
| 2003/0227401 A1 | 12/2003 | Yang et al. |
| 2004/0032355 A1 | 2/2004 | Melanson et al. |
| 2004/0066321 A1 | 4/2004 | Brooks et al. |
| 2004/0081266 A1 | 4/2004 | Adachi et al. |
| 2004/0108947 A1 | 6/2004 | Yang et al. |
| 2004/0228416 A1 | 11/2004 | Anderson et al. |
| 2004/0233084 A1 | 11/2004 | Brooks et al. |
| 2004/0233085 A1 | 11/2004 | Fukuda et al. |
| 2004/0252038 A1 | 12/2004 | Robinson et al. |
| 2005/0001750 A1 | 1/2005 | Lo et al. |
| 2005/0012649 A1 | 1/2005 | Adams et al. |
| 2005/0030212 A1 | 2/2005 | Brooks et al. |
| 2005/0057385 A1 | 3/2005 | Gupta et al. |
| 2005/0062627 A1 | 3/2005 | Jelonnek et al. |
| 2005/0063505 A1 | 3/2005 | Dubash et al. |
| 2005/0088327 A1 | 4/2005 | Yokoyama et al. |
| 2005/0093726 A1 | 5/2005 | Hezar et al. |
| 2005/0116850 A1 | 6/2005 | Hezar et al. |
| 2005/0128111 A1 | 6/2005 | Brooks et al. |
| 2005/0156767 A1 | 7/2005 | Melanson et al. |
| 2005/0156768 A1 | 7/2005 | Melanson et al. |
| 2005/0156771 A1 | 7/2005 | Melanson et al. |
| 2005/0162222 A1 | 7/2005 | Hezar et al. |
| 2005/0207480 A1 | 9/2005 | Norsworthy et al. |
| 2005/0237119 A1 | 10/2005 | Irie |
| 2005/0266805 A1 | 12/2005 | Jensen et al. |
| 2005/0285685 A1 | 12/2005 | Frey et al. |
| 2006/0028364 A1 | 2/2006 | Rivoir et al. |
| 2006/0038708 A1 | 2/2006 | Luh et al. |
| 2006/0044057 A1 | 3/2006 | Hezar et al. |
| 2006/0109153 A1 | 5/2006 | Gupta et al. |
| 2006/0115036 A1 | 6/2006 | Adachi et al. |
| 2006/0164276 A1 | 7/2006 | Luh et al. |
| 2006/0290549 A1 | 12/2006 | Laroia et al. |
| 2007/0001776 A1 | 1/2007 | Li et al. |
| 2007/0013566 A1 | 1/2007 | Chuang et al. |
| 2007/0018866 A1 | 1/2007 | Melanson et al. |
| 2007/0035425 A1 | 2/2007 | Hinrichs et al. |
| 2007/0080843 A1 | 4/2007 | Lee et al. |
| 2007/0126618 A1 | 6/2007 | Tanaka et al. |
| 2007/0152865 A1 | 7/2007 | Melanson et al. |
| 2007/0165708 A1 | 7/2007 | Darabi et al. |
| 2007/0279034 A1 | 12/2007 | Roh et al. |
| 2008/0062022 A1 | 3/2008 | Melanson et al. |
| 2008/0062024 A1 | 3/2008 | Maeda et al. |
| 2008/0100486 A1 | 5/2008 | Lin et al. |
| 2008/0180166 A1 | 7/2008 | Gustat et al. |
| 2008/0191713 A1 | 8/2008 | Hauer et al. |
| 2008/0198050 A1 | 8/2008 | Akizuki et al. |
| 2008/0211588 A1 | 9/2008 | Frey et al. |
| 2008/0272945 A1 | 11/2008 | Melanson et al. |
| 2008/0272946 A1 | 11/2008 | Melanson et al. |
| 2009/0083567 A1 | 3/2009 | Kim et al. |
| 2009/0096649 A1 | 4/2009 | Ferri et al. |
| 2009/0220219 A1 | 9/2009 | McLeod et al. |
| 2009/0309774 A1 | 12/2009 | Hamashita et al. |
| 2010/0020910 A1 | 1/2010 | Bhagavatheeswaran et al. |
| 2010/0045498 A1 | 2/2010 | Liu et al. |
| 2010/0052960 A1 | 3/2010 | Lakdawala et al. |
| 2010/0074368 A1 | 3/2010 | Karthaus et al. |
| 2010/0164773 A1 | 7/2010 | Clement et al. |
| 2010/0214143 A1 | 8/2010 | Nakamoto et al. |
| 2010/0219999 A1 | 9/2010 | Oliaei et al. |
| 2010/0225517 A1 | 9/2010 | Aiba et al. |
| 2010/0283648 A1 | 11/2010 | Niwa et al. |
| 2010/0295715 A1 | 11/2010 | Sornin et al. |
| 2011/0006936 A1 | 1/2011 | Lin et al. |
| 2011/0050472 A1 | 3/2011 | Melanson et al. |
| 2011/0149155 A1 | 6/2011 | Lin et al. |
| 2011/0299642 A1 | 12/2011 | Norsworthy et al. |
| 2012/0063519 A1 | 3/2012 | Oliaei et al. |
| 2012/0161864 A1 | 6/2012 | Lee et al. |
| 2012/0194369 A1 | 8/2012 | Galton et al. |
| 2012/0200437 A1 | 8/2012 | Moue et al. |
| 2012/0242521 A1 | 9/2012 | Kinyua et al. |
| 2012/0275493 A1 | 11/2012 | Fortier et al. |
| 2012/0280843 A1 | 11/2012 | Tsai et al. |
| 2012/0286982 A1 | 11/2012 | Kajita et al. |
| 2013/0068019 A1 | 3/2013 | Takase et al. |
| 2013/0099949 A1 | 4/2013 | Wagner et al. |
| 2013/0169460 A1 | 7/2013 | Obata et al. |
| 2013/0259103 A1 | 10/2013 | Jensen et al. |
| 2014/0028374 A1 | 1/2014 | Zare-Hoseini et al. |
| 2014/0035769 A1 | 2/2014 | Rajaee et al. |
| 2014/0070969 A1 | 3/2014 | Shu |
| 2014/0113575 A1 | 4/2014 | Mitani et al. |
| 2014/0139293 A1 | 5/2014 | Tsangaropoulos et al. |
| 2014/0286467 A1 | 9/2014 | Norsworthy et al. |
| 2014/0307825 A1 | 10/2014 | Ostrovskyy et al. |
| 2014/0320325 A1 | 10/2014 | Muthers et al. |
| 2014/0368365 A1 | 12/2014 | Quiquempoix et al. |
| 2015/0002325 A1 | 1/2015 | Lin |
| 2015/0009054 A1 | 1/2015 | Ono et al. |
| 2015/0036766 A1 | 2/2015 | Elsayed et al. |
| 2015/0061907 A1 | 3/2015 | Miglani |
| 2015/0084797 A1 | 3/2015 | Singh et al. |
| 2015/0109157 A1 | 4/2015 | Caldwell et al. |
| 2015/0116138 A1 | 4/2015 | Li et al. |
| 2015/0146773 A1 | 5/2015 | Ma et al. |
| 2015/0171887 A1 | 6/2015 | Okuda |
| 2015/0341159 A1 | 11/2015 | Norsworthy et al. |
| 2015/0349794 A1 | 12/2015 | Line |
| 2016/0013805 A1 | 1/2016 | Maehata |
| 2016/0049947 A1 | 2/2016 | Adachi |
| 2016/0050382 A1 | 2/2016 | Rizk et al. |
| 2016/0065236 A1 | 3/2016 | Ahmed et al. |
| 2016/0127119 A1* | 5/2016 | Anantharaman Chandrasekarapuram ............ H04B 1/1027 375/371 |
| 2016/0149586 A1 | 5/2016 | Roh et al. |
| 2016/0336946 A1 | 11/2016 | Ho et al. |
| 2016/0344404 A1 | 11/2016 | Miglani et al. |
| 2016/0359499 A1 | 12/2016 | Bandyopadhyay |
| 2016/0373125 A1 | 12/2016 | Pagnanelli et al. |
| 2017/0033801 A1 | 2/2017 | Lo et al. |
| 2017/0041019 A1 | 2/2017 | Miglani et al. |
| 2017/0045403 A1 | 2/2017 | Zanbaghi et al. |
| 2017/0093407 A1 | 3/2017 | Kim et al. |
| 2017/0102248 A1 | 4/2017 | Maurer et al. |
| 2017/0134055 A1 | 5/2017 | Ebrahimi et al. |
| 2017/0163295 A1 | 6/2017 | Talty et al. |
| 2017/0170839 A1 | 6/2017 | Zhao et al. |
| 2017/0170840 A1 | 6/2017 | Zhao |
| 2017/0184645 A1 | 6/2017 | Sawataishi |
| 2017/0222652 A1 | 8/2017 | Adachi |
| 2017/0222658 A1 | 8/2017 | Miglani et al. |
| 2017/0250662 A1 | 8/2017 | Cope et al. |
| 2017/0276484 A1 | 9/2017 | Marx et al. |
| 2017/0288693 A1 | 10/2017 | Kumar et al. |
| 2018/0145700 A1 | 5/2018 | Yu et al. |
| 2019/0356329 A1 | 11/2019 | Yu et al. |

(56) References Cited

U.S. PATENT DOCUMENTS

2020/0106448 A1  4/2020  Yu et al.
2021/0175889 A1  6/2021  Yu et al.

FOREIGN PATENT DOCUMENTS

| WO | 2016063038 A1 | 4/2016 |
| WO | 2016063038 A4 | 7/2016 |
| WO | 2018094380 A1 | 5/2018 |

OTHER PUBLICATIONS

International Preliminary Report on Patentability for International Application PCT/US2017/062744, Report dated May 21, 2019, dated May 31, 2019, 8 Pgs.

International Search Report and Written Opinion for International Application No. PCT/US2017/062744, Search completed Jan. 17, 2018, dated Feb. 5, 2018, 13 Pgs.

Aigner et al., "Advancement of MEMS into RF-Filter Applications", International Electron Devices Meetings, IEDM '02, Dec. 8-11, 2002, pp. 897-900.

Lam, "A Review of the Recent Development of MEMS and Crystal Oscillators and Their Impacts on the Frequency Control Products Industry", Invited Paper, 2008 IEEE International Ultrasonics Symposium, Beijing, Nov. 2-5, 2008, 11 pages.

Majd et al., "Bandwidth Enhancement in Delta Sigma Modulator Transmitter Using Low Complexity Time-Interleaved Parallel Delta Sigma Modulator", AEU-International Journal of Electronics and Communications, Apr. 11, 2015, vol. 69, No. 7, pp. 1032-1038.

Piazza et al., "Piezoelectric Aluminum Nitride Vibrating Contour-Mode MEMS Resonators", Journal of Microelectromechanical Systems, Dec. 2006, vol. 15, No. 6, pp. 1406-1418.

International Search Report and Written Opinion for International Application No. PCT/US2022/070817, Search completed Apr. 13, 2022, dated Jun. 16, 2022, 20 pgs.

* cited by examiner

SYSTEMS AND METHODS FOR SYNTHESIS OF MODULATED RF SIGNALS

FIELD OF THE INVENTION

The present invention generally relates to synthesis of a modulated RF signal using one of several different modulation schemes including, but not limited to, amplitude shift keying, phase shift keying, quadrature phase shift keying, quadrature amplitude modulation, and/or amplitude phase shift keying. In particular, the present invention provides details on several different modulation schemes for use in direct RF transmitters, including: Frequency Modulated Continuous Wave (FMCW), Frequency Diversity with Hopping, Code-modulated Continuous Wave (CMCW), and Orthogonal Frequency-Division Multiplexing (OFDM).

BACKGROUND

Modern electronic systems process and store information digitally. However, due to the analog nature of the world, conversions between analog and digital domains are always needed and performed by data converters. Digital-to-analog converters (DACs) are used to convert digital codewords into analog signals (voltage, current, etc.).

The phase locked loop (PLL) has been widely used in communication applications. PLLs have been used to recover a signal from a noisy communication channel, generate a stable frequency at multiples of an input frequency, and for demodulating a signal.

Modern high-speed DACs that feature high resolution and multi-GHz sample rates provide a basis for some direct RF modulation schemes. In the RF modulation schemes, the modulated transmission signal is generated directly on the base frequency. The direct RF transmitter architecture offers many advantages over traditional RF transmitters such as elimination of a LO feed through and an image. In accordance with these schemes, the performance of direct RF transmitters can be limited by the DAC noise and the phase noise of the DAC clock. The phase noise of the DAC clock determines the adjacent channel leakage ratio (ACPR) and the transmitter modulation error ratio (MER) at the high carrier frequency. The phase noise performance of indirect frequency synthesis using a PLL is inferior to the BAW oscillator. Accordingly, direct RF transmitter with a BAW based oscillator provide better phase noise performance.

SUMMARY OF THE INVENTION

Systems and methods for synthesis of a modulated RF signal using one of several different modulation schemes including, but not limited to, amplitude shift keying, phase shift keying, quadrature phase shift keying, quadrature amplitude modulation, and/or amplitude phase shift keying in accordance with embodiments of the invention are described. In an embodiment, a direct frequency synthesizer includes: a high speed BAW resonator configured to generate a frequency signal; a BAW oscillator capable of receiving the frequency signal and configured to generate an output BAW clock signal (BAW CLK); a frequency and phase estimation circuit capable of receiving a reference clock signal from a reference clock (REF CLK) and the BAW CLK, where the frequency and phase estimation circuit is configured to generate a frequency error signal and a phase error signal; a frequency chirp generator capable of receiving chirp parameters, and a chirp sync signal, where the direct digital frequency synthesizer is configured to generate a sequence of nominal frequency control word (FCW); a frequency control word (FCW) generator that is capable of receiving an input FCW from the frequency chirp generator, and the phase error signal and the frequency error signal from the frequency and phase estimation circuit, where the FCW generator is configured to generate a corrected FCW based upon the input FCW, the phase error signal and the frequency error signal; a direct digital frequency synthesizer capable of receiving the BAW CLK and the corrected FCW, where the direct digital frequency synthesizer is configured to generate a codeword based upon the BAW CLK and the corrected FCW; and a high speed digital to analog converter (HS DAC) capable of receiving the BAW CLK and the codeword, where the HS DAC is configured to synthesize an analog signal.

In a further embodiment, the analog signal transmitted is a continuous wave that varies up and down in frequency over a fixed period by a modulated signal.

In a further embodiment, the FCW is generated according to chirp parameters specified by a user.

In a further embodiment, the frequency errors and phase errors are added to compensate for frequency and phase differences between the REF CLK and the BAW oscillator.

In a further embodiment, the analog signal is be specified in the following equation:

$$x(t) = \sin\left(2\pi\left(f_0 + \frac{\alpha}{2}t\right)t + \theta_0\right)$$

wherein:
$f_0$: initial frequency of the chirp signal
$\alpha$: frequency ramp rate of the chirp signal
$\theta_0$: initial phase of the chirp signal
wherein a chirp signal is generated digitally and converted to the analog signal with the high-speed DAC, wherein a digital codeword $x_n$ can be specified in the following equation:

$$x_n = x(t = nT_s) = \sin(\theta_n)$$

$$\theta_n = \begin{cases} \theta_0, n = 0 \\ \theta_{n-1} + 2\pi f_{n-1} + \pi\alpha T_s^2, n > 0 \end{cases}$$

$$f_n = \begin{cases} f_0 T_s, n = 0 \\ f_{n-1} + \alpha T_s^2, n > 0 \end{cases}$$

wherein:
$T_s$: sample period of the DAC clock
$f_n$: frequency at time $t=nT_s$;
wherein, for non-stationary sample clock, digital codeword $x_n$ can be adjusted as follows:

$$x_n' = x(t = nT_s') = \sin(\theta_n')$$

$$\theta_n' = \begin{cases} \theta_0, n = 0 \\ \theta_{n-1}' + 2\pi f_{n-1}' + \pi\alpha(T_s + \Delta T_s)^2, n > 0 \end{cases}$$

$$f_n' = \begin{cases} f_0(T_s + \Delta T_s), n = 0 \\ f_{n-1}' + \alpha(T_s + \Delta T_s)^2, n > 0 \end{cases}$$

wherein:
$T_s'$: non-stationary sample period of the DAC clock ($T_s' = T_s + \Delta T_s$).

In another embodiment, a direct frequency synthesizer includes: a high speed BAW resonator configured to generate a frequency signal; a BAW oscillator capable of receiving the frequency signal and configured to generate an output BAW clock signal (BAW CLK); a frequency and phase estimation circuit capable of receiving a reference clock signal from a reference clock (REF CLK) and the BAW CLK, where the frequency and phase estimation circuit is configured to generate a frequency error signal and a phase error signal; a frequency hop frequency control word generator capable of receiving frequency hopping parameters, a sync signal, where the frequency hop frequency control word generator is configured to generate a sequence of nominal frequency control word (FCW); a frequency control word (FCW) generator that is capable of receiving an input FCW from the frequency hop frequency control word generator, and the frequency error signal and the phase error signal from the frequency and phase estimation circuit, wherein the frequency control word generator is configured to generate a corrected FCW based upon the input FCW, the frequency error signal, and the phase error signal; a direct digital frequency synthesizer capable of receiving the BAW CLK and the corrected FCW, where the direct digital frequency synthesizer is configured to generate a codeword based upon the BAW CLK and the corrected FCW; and a high speed digital to analog converter (HS DAC) capable of receiving the BAW CLK and the codeword, wherein the HS DAC is configured to output an analog signal.

In a further embodiment, an output frequency is changed from one frequency to another one controlled by a pseudo-random (PN) sequence.

In a further embodiment, a signal is expressed by the following equation:

$$x(t) = \sin(2\pi f(t)t + \theta_0)$$

$$f(t) = f_{rand(n)}, \ t_{n-1} \leq t < t_n, \ n \in [1, \ldots, N]$$

wherein:

$f_1, \ldots, f_N$: list of frequencies used in the frequency hopping system $t_1, \ldots, t_N$: frequency hopping time rand(n): random frequency mapping in the frequency hopping system $\theta_0$: initial phase of the sine wave wherein:

the frequency hopping signal is synthesized digitally and digital codeword $x_n$ is converted to the analog signal through the high-speed digital-to-analog converter (DAC); wherein:

the relationship between x(t) and $x_n$ is given by the following equation:

$$x_n = x(t = nT_s) = \sin(2\pi f(t)nT_s + \theta_0) = \sin(2\pi f_c(t)n + \theta_0)$$

$$f_c(t) = f_{rand(n)}T_s, t_{n-1} \leq t < t_n, n \in [1, \ldots, N]$$

wherein:

$T_s$: sample period of the DAC clock;

wherein, if the sample clock is non-stationary, the digital codeword $x_n$ is adjusted so the output frequency stays at the desired frequency by the following equation:

$$x_n' = x(t = nT_s') = \sin(2\pi f(t)nT_s' + \theta_0) = \sin(2\pi(f_c(t) + \Delta f_c(t))n + \theta_0)$$

wherein:

$T_s'$: non-stationary sample period of the DAC clock ($T_s' = T_s + \Delta T_s$)

$\Delta f_c(t)$: frequency control word error ($\Delta f_c(t) = f_c(t) \ast \Delta T_s/T_s$).

In another embodiment, a direct frequency synthesizer includes: a high speed BAW resonator configured to generate a frequency signal; a BAW oscillator capable of receiving the frequency signal, where the BAW oscillator is configured to generate an output BAW clock signal (BAW CLK); a frequency and phase estimation circuit capable of receiving a reference clock signal from a reference clock (REF CLK) and the BAW CLK, where the frequency and phase estimation circuit is configured to generate a frequency error signal and a phase error signal; a code-modulated continuous wave (CMCW) generator capable of receiving CM parameters and a sync signal, where the CMCW generator is configured to generate a codeword; a variable interpolator/decimator (VID) capable of receiving the codeword from the CMCW generator, the phase error signal and the frequency error signal from the frequency and phase estimation circuit and the BAW CLK signal from the BAW oscillator, where the VID is configured to generate a corrected codeword; a high speed digital to analog converter (HS DAC) capable of receiving the BAW CLK and the corrected codeword, where the HS DAC is configured to output an analog signal.

In a further embodiment, the CMCW modulates a high frequency continuous wave with a wide-band code sequence.

In a further embodiment, the codeword is a digital codeword $x_n$; where $x_n$ is converted to the analog signal through the high-speed digital-to-analog converter (HS DAC); where $x_n$ corresponds to a desired analog signal at $t = nT_s$ where $T_s$ is the period of the sample clock; where, for a non-stationary sample clock where the sample time happens at $t' = nT_s'$ or $(nT_s + \Delta T_s)$, the digital codeword is adjusted and the corrected codeword $x_n'$ is calculated by the variable-interpolator-decimator (VID) by the following equation:

$$x_n' = x(t = nT_s') = x(t = nT_s + \Delta T_s) = \begin{cases} x_n \dfrac{1 - \Delta T_s}{T_s} + x_{n+1} \dfrac{\Delta T_s}{T_s}, & \Delta T_s \geq 0 \\ x_n \dfrac{1 + \Delta T_s}{T_s} - x_{n-1} \dfrac{\Delta T_s}{T_s}, & \Delta T_s < 0 \end{cases}$$

wherein for all VID filters, codeword $x_n'$ can be calculated as follows:

$$x_n' = x(t = nT_s') = x(t = nT_s + \Delta T_s) = \sum_{i=-L}^{L} h(i) \ast x_{n+i}$$

wherein h(i): VID filter coefficients.

In another embodiment, a direct frequency synthesizer includes: a high speed BAW resonator configured to generate a frequency signal; a BAW oscillator capable of receiving the frequency signal, where the BAW oscillator is configured to generate an output BAW clock signal (BAW CLK); a frequency and phase estimation circuit capable of receiving a reference clock signal from a reference clock (REF CLK) and the BAW CLK from the BAW oscillator, where the frequency and phase estimation circuit is configured to generate a frequency error signal and a phase error signal; an orthogonal frequency-division multiplexing (OFDM) generator that is capable of receiving OFDM modulation parameters and a sync signal, where the OFDM generator is configured to generate a codeword; a variable interpolator/decimator (VID) that is capable of receiving the codeword from the OFDM generator, the phase error signal and the frequency error signal from the frequency and phase estimation circuit, and the BAW CLK from the BAW oscillator, where the VID is configured to generate a corrected codeword; a high speed digital to analog converter (HS DAC) that is capable of receiving the BAW CLK from the BAW oscillator and the corrected codework from the VID, where the HS DAC is configured to output an analog signal.

In a further embodiment, an OFDM signal includes coded signals transmitted on multiple carriers continuously and in parallel.

In a further embodiment, the codeword is a digital codeword $x_n$: where $x_n$ is converted to the analog signal through the high-speed digital-to-analog converter (HS DAC); where $x_n$ corresponds to a desired analog signal at $t=nT_s$ where $T_s$ is the period of the sample clock; where, for a non-stationary sample clock where the sample time happens at $t'=nT_s'$ or $(nT_s+\Delta T_s)$, the digital codeword is adjusted and the corrected codeword $x_n'$ is calculated by the variable-interpolator-decimator (VID) by the following equation:

$$x_n' = x(t = nT_s') = x(t = nT_s + \Delta T_s) = \begin{cases} x_n \frac{1-\Delta T_s}{T_s} + x_{n+1} \frac{\Delta T_s}{T_s}, \Delta T_s \geq 0 \\ x_n \frac{1+\Delta T_s}{T_s} - x_{n-1} \frac{\Delta T_s}{T_s}, \Delta T_s < 0 \end{cases}$$

wherein For all VID filters, codeword $x_n'$ can be calculated as follows:

$$x_n' = x(t = nT_s') = x(t = nT_s + \Delta T_s) = \sum_{i=-L}^{L} h(i) * x_{n+i}$$

wherein h(i): VID filter coefficients.

DETAILED DESCRIPTION OF THE DRAWINGS

Turning now to the drawings, systems and methods in accordance with many embodiments of the invention synthesize a modulated RF signal using one of a variety of different modulation schemes including, but not limited to, amplitude shift keying, phase shift keying, quadrature phase shift keying, quadrature amplitude modulation, and/or amplitude phase shift keying.

In several embodiments, a sequence frequency control world for a direct digital frequency synthesizer is selected to synthesize a signal in which a symbol is modulated onto a controlled carrier frequency. The specific manner in which the frequency control words are selected depends upon the stability of a reference signal and/or the particular modulation scheme utilized for data transmission.

Figure 1A:
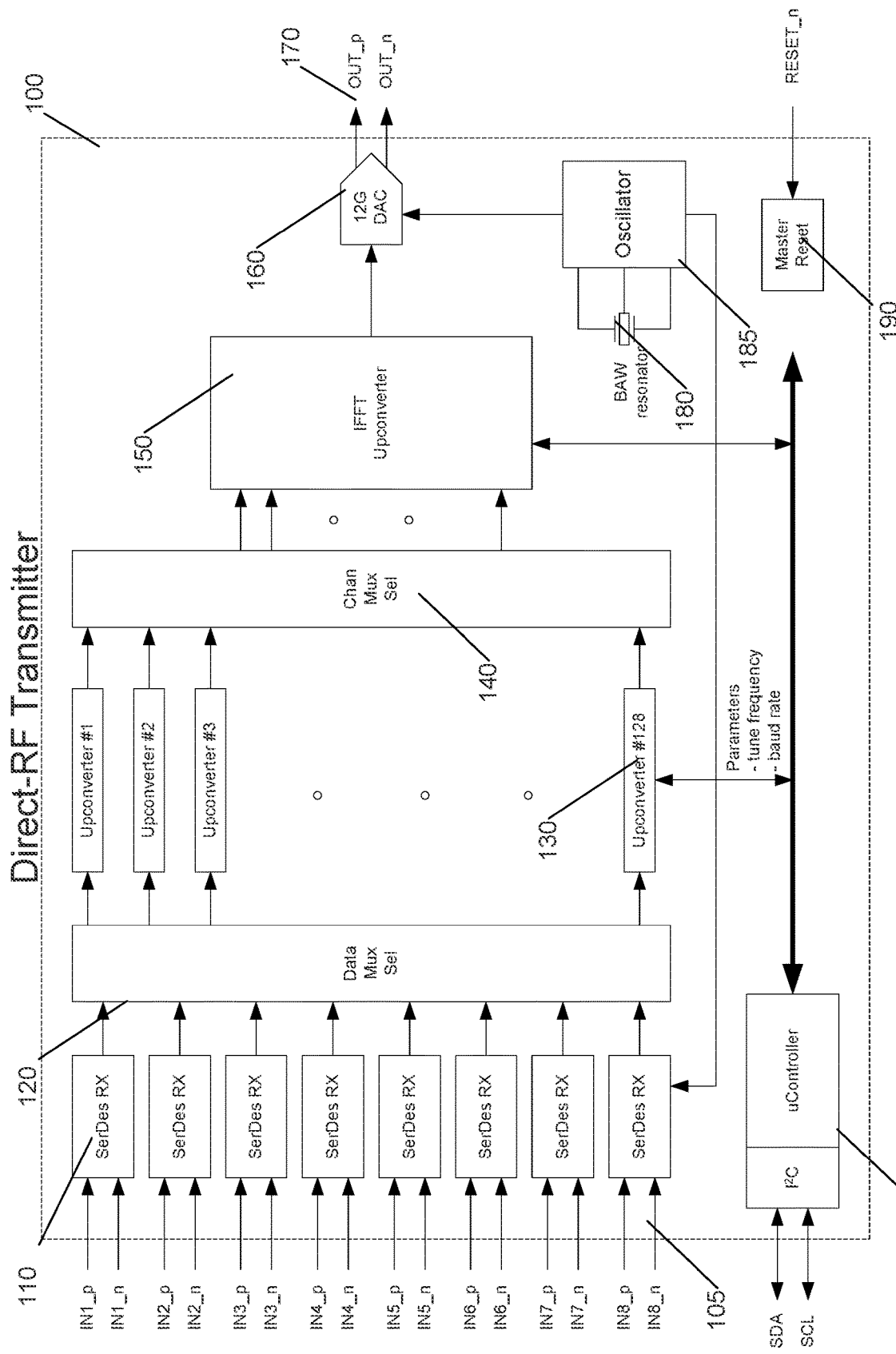
FIG. 1A conceptually illustrates a direct RF-transmitter in accordance with an embodiment of the invention.

In the various architectures specified by U.S. patent application Ser. No. 15/470,616 issued as U.S. Pat. No. 10,530,372, entitled "Systems and Methods for Digital Synthesis of Output Signals Using Resonators" to Yu et al., the relevant disclosure from which including the disclosure related to architectures and device implementations is herein incorporated by reference, the sample clock for a DAC can be taken from a free running oscillator for improved phase noise performance. An example of a direct RF-transmitter using a direct frequency synthesizer in accordance with an embodiment of the invention is illustrated in FIG. 1. As illustrated, a direct-RF transmitter 100 receives a plurality of input signals 105 that are input to 'n' serializers/deserializers (SerDes RX) 110. Each serializer/deserializer 110 converts data between serial data and parallel interfaces in each direction. The outputs of the SerDes RXs 110 are provided to a data multiplexer select (Data Mux Sel) 120, whose outputs are provided to 'n' upconverters 130. The outputs of the upconverters 130 are provided to a channel multiplexer select (Chan Mux Sel) 140. The outputs of the Chan Mux Sel 140 is provided to an IFFT Upconverter 150. The output of the IFFT Upconverter 150 is provided to a 12G digital to analog converter 160.

BAW resonator 180 provides a resonant frequency to oscillator 1785, and this is provided as an input to the 12G DAC 160 and the SerDes RX 110. Furthermore, I2C and uController 195 provide outputs to the IFFT Upconverter 150. Although FIG. 1 illustrates an example circuit implementation for a direct RF-transmitter, any of a variety of different architectures may be utilized as appropriate to the requirements of specific applications in accordance with embodiments of the invention.

Described below are further details on implementations of the following modulation schemes that can be utilized by a direct RF-transmitter, including: Frequency Modulated Continuous Wave (FMCW), Frequency Diversity with Hopping, Code-modulated Continuous Wave (CMCW), Orthogonal Frequency-Division Multiplexing (OFDM), among others in accordance with many embodiments of the invention.

An analog sine wave can be specified in the following equation:

$x(t)=\sin(2\pi ft+\theta_0)$ f: frequency of the sine wave.

$\theta_0$: initial phase of the sine wave.

In a digital frequency synthesis architecture in accordance with many embodiments, digital codeword $x_n$ can be generated digitally and converted to an analog signal through a high-speed digital-to-analog converter (HS DAC). The relationship between x(t) and $x_n$ can be given by the following equation $x_n=x(t=nT_s)=\sin(2\pi fnT_s+\theta_0)=\sin(2\pi f_c n+\theta_0)$ $T_s$: sample period of the DAC clock.

$f_c$: digital frequency control word ($f_c=fT_s$).

As noted above, in certain architectures specified by U.S. patent application Ser. No. 15/470,616 issued as U.S. Pat.

No. 10,530,372, entitled "Systems and Methods for Digital Synthesis of Output Signals Using Resonators" to Yu et al., the sample clock for a DAC can be taken from a free running oscillator for improved phase noise performance. In many embodiments, the sample clock may not be stationary and can change in frequency over time. Accordingly, in many embodiments, the digital codeword $x_n$ may need to be adjusted so the output frequency stays constant. This adjustment can be illustrated by the following equation:

$$x_n' = x(t=nT_s') = \sin(2\pi f n T_s' + \theta_0) = \sin(2\pi(f_c + \Delta f_c)n + \theta_0)$$

Where:
$T_s'$: non-stationary sample period of the DAC clock ($T_s' = T_s + \Delta T_s$)
$\Delta f_c$: frequency control word error ($\Delta f_c = f * \Delta T_s$).

Figure 1B:
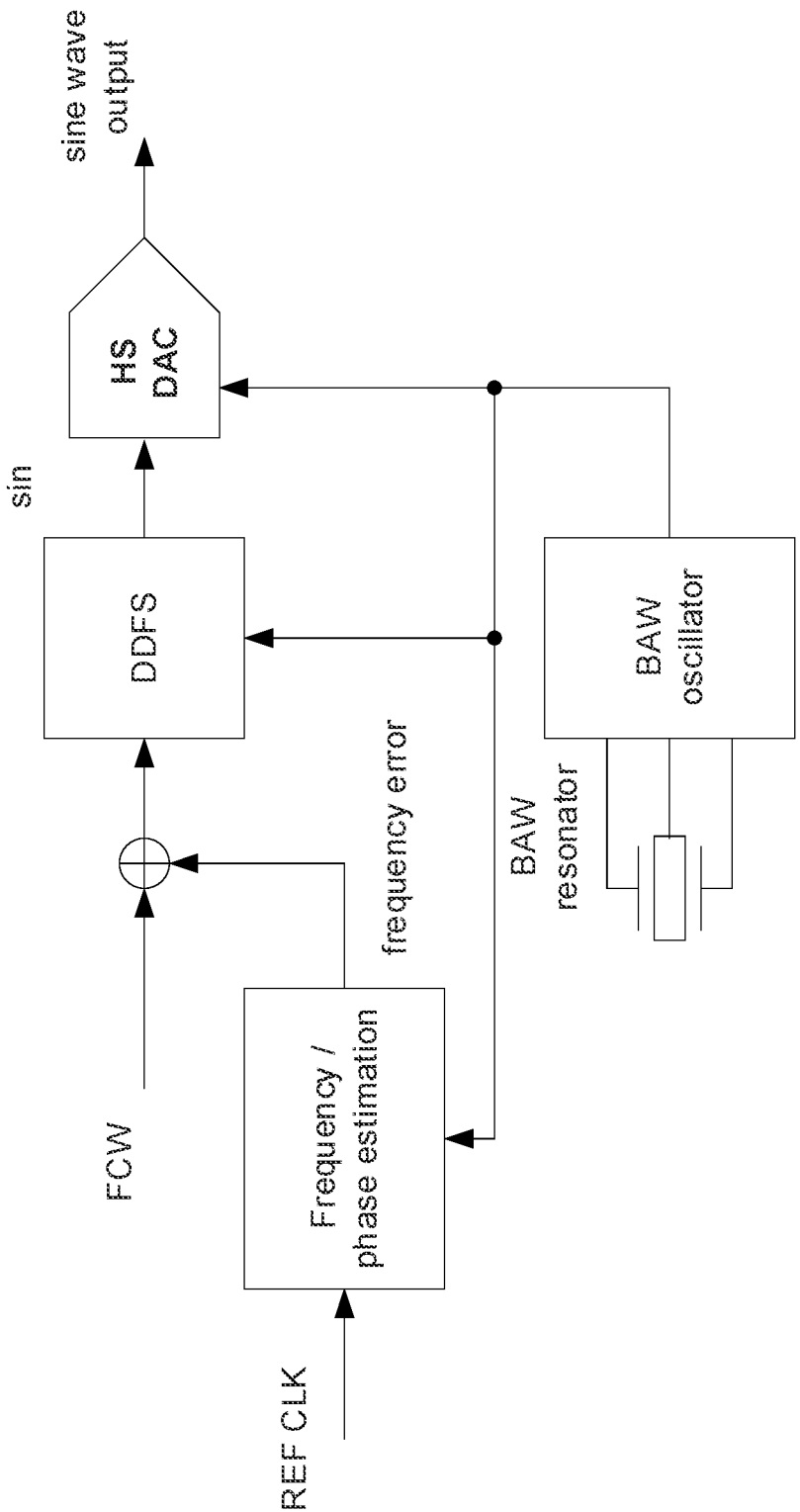
FIG. 1B illustrates a circuit diagram of a single tone generator in accordance with an embodiment of the invention.

A circuit architecture for a single tone generator in accordance with an embodiment of the invention is shown in FIG. 1B. As illustrated, the system includes a frequency/phase estimation circuit, a BAW oscillator that generates a BAW CLK, a BAW resonator, a direct digital frequency synthesizer (DDFS), and a high speed digital to analog convertor (HS DAC).

The frequency/phase estimation circuit can receive a reference clock (REF CLK) and the BAW CLK and generate a frequency error that is added to a nominal frequency control word (FCW) to generate a corrected FCW that is then provided to the DDFS. The DDFS can receive also the BAW clock and output a codeword to the HS DAC. Although FIG. 1B illustrates a particular circuit architecture of a single tone generator, any of a variety of architectures can be specified as appropriate to the requirements of a particular application in accordance with various embodiments of the invention.

Figure 2:
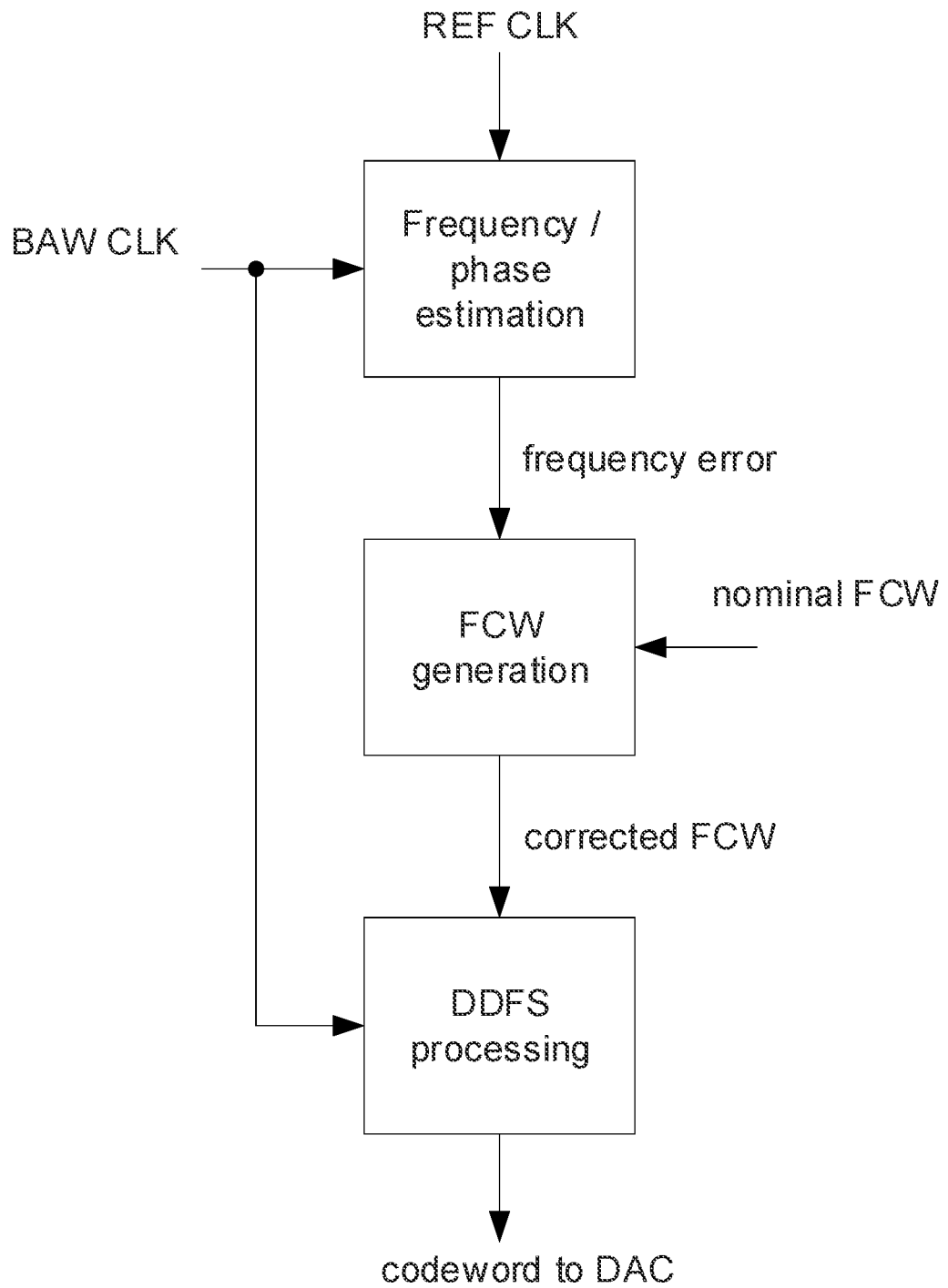
FIG. 2 illustrates a process for single tone generation in accordance with an embodiment of the invention.

A process for signal synthesis in accordance with an embodiment of the invention is illustrated in FIG. 2. As illustrated, a frequency/phase estimation circuit can receive a reference clock (REF CLK) and a BAW CLK and generate a frequency error that is provided to a frequency control word (FCW) generation circuit. The FCW generation circuit can also obtain a nominal FCW in order to generate a corrected FCW that is provided to a DDFS processing circuit to generate a codeword that is provided to a DAC. Although a specific process is illustrated in FIG. 2, any of a variety of processes can be utilized to generate a frequency tone as appropriate to the requirements of a specific application in accordance with an embodiment of the invention.

Furthermore, although FIG. 1B illustrates a single frequency tone generation architecture, this architecture can be extended beyond single frequency tone generation. Described below are several signal generation architectures for frequency tone generation in accordance with various embodiments of the invention.

FMCW Generation

In a frequency modulated continuous wave (FMCW) system in accordance with many embodiments, a transmitted signal can be a continuous wave that varies up and down in frequency over a fixed period by a modulated signal. FMCW may also be known as frequency chirp. FMCW systems in accordance with many embodiments can be used in radar applications among various other applications and can measure a distance and relative velocity simultaneously.

An FMCW signal can be specified in the following equation:

$$x(t) = \sin\left(2\pi\left(f_0 + \frac{\alpha}{2}t\right)t + \theta_0\right)$$

Where:
$f_0$: initial frequency of the chirp signal
$\alpha$: frequency ramp rate of the chirp signal
$\theta_0$: initial phase of the chirp signal.

Similarly, a chirp signal can be generated digitally and converted to an analog signal with a high-speed DAC. Digital codeword $x_n$ can be specified in the following equation:

$$x_n = x(t=nT_s) = \sin(\theta_n)$$

$$\theta_n = \begin{cases} \theta_0, n = 0 \\ \theta_{n-1} + 2\pi f_{n-1} + \pi \alpha T_s^2, n > 0 \end{cases}$$

$$f_n = \begin{cases} f_0 T_s, n = 0 \\ f_{n-1} + \alpha T_s^2, n > 0 \end{cases}$$

$T_s$: sample period of the DAC clock.
$f_n$: frequency at time $t=nT_s$.

For a non-stationary sample clock, digital codeword $x_n$ can be adjusted as follows:

$$x_n' = x(t=nT_s') = \sin(\theta_n')$$

$$\theta_n' = \begin{cases} \theta_0, n = 0 \\ \theta_{n-1}' + 2\pi f_{n-1}' + \pi \alpha (T_s + \Delta T_s)^2, n > 0 \end{cases}$$

$$f_n' = \begin{cases} f_0(T_s + \Delta T_s), n = 0 \\ f_{n-1}' + \alpha (T_s + \Delta T_s)^2, n > 0 \end{cases}$$

$T_s'$: non-stationary sample period of the DAC clock ($T_s' = T_s + \Delta T_s$).

Figure 3:
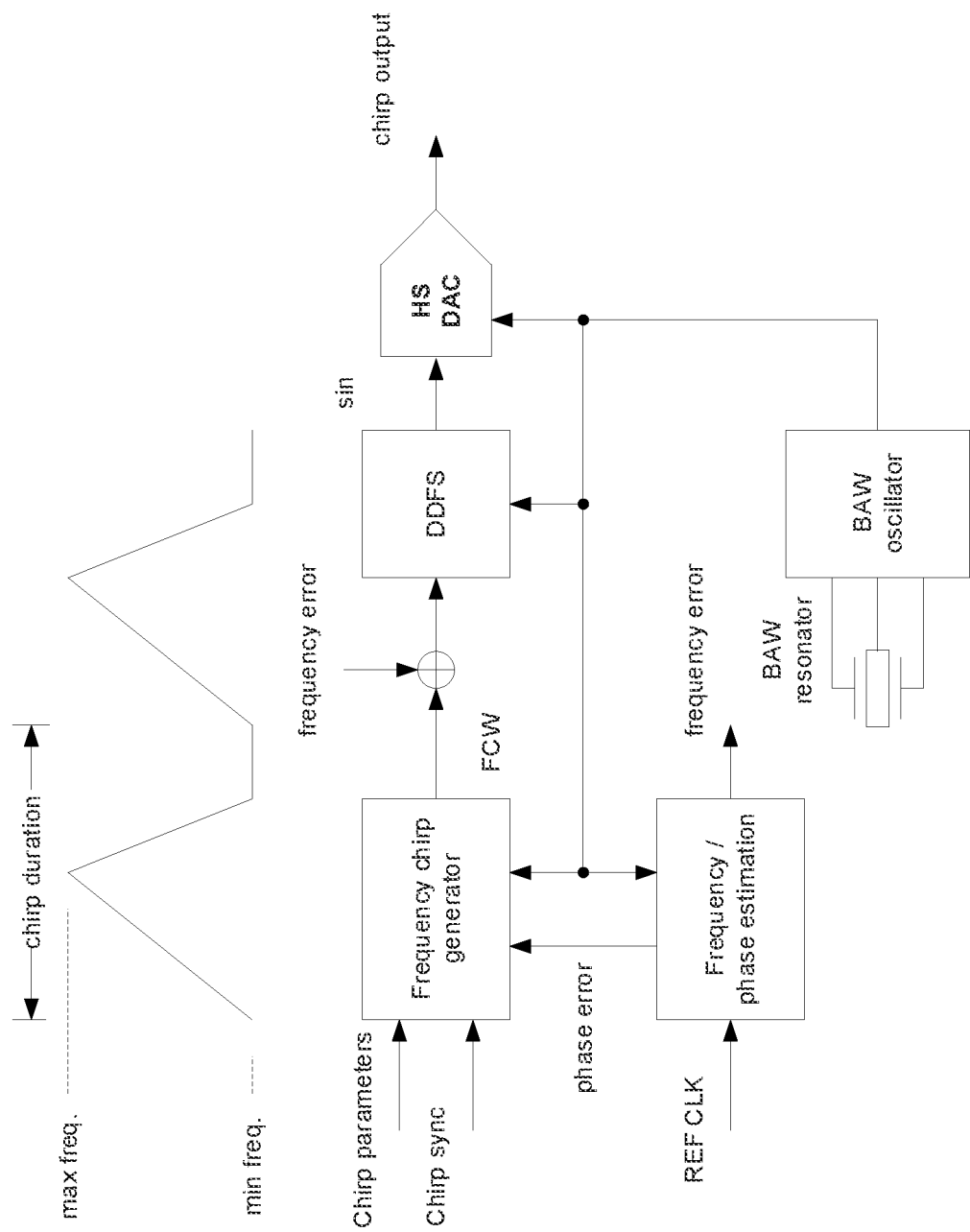
FIG. 3 illustrates a circuit diagram of a frequency modulated continuous wave (FMCW) generator in accordance with an embodiment of the invention.

An FMCW generation architecture for digital synthesis using a resonator in accordance with an embodiment of the invention is illustrated in FIG. 3. As illustrated in FIG. 3, the architecture can include a frequency chirp generator circuit, a frequency/phase estimation circuit, a DDFS, an HS DAC, a BAW resonator, and a BAW oscillator. The frequency/phase estimation circuit can receive a REF CLK and a BAW CLK and generate a phase error and frequency error. The frequency chirp generator can receive chirp parameters, a chirp sync signal and generate a nominal FCW that is provided to an adder that receives the phase error and frequency error and generates a corrected FCW that is provided to the DDFS. The DDFS can receive the BAW CLK and the corrected FCW and generate a codeword that is provided to the HS DAC. The HS DAC can generate a chirp output. Although FIG. 3 illustrates a particular FMCW generator circuit architectures, any of a variety of FMCW circuit architectures can be utilized as appropriate to the requirements of a specific application in accordance with an embodiment of the invention.

Figure 4:
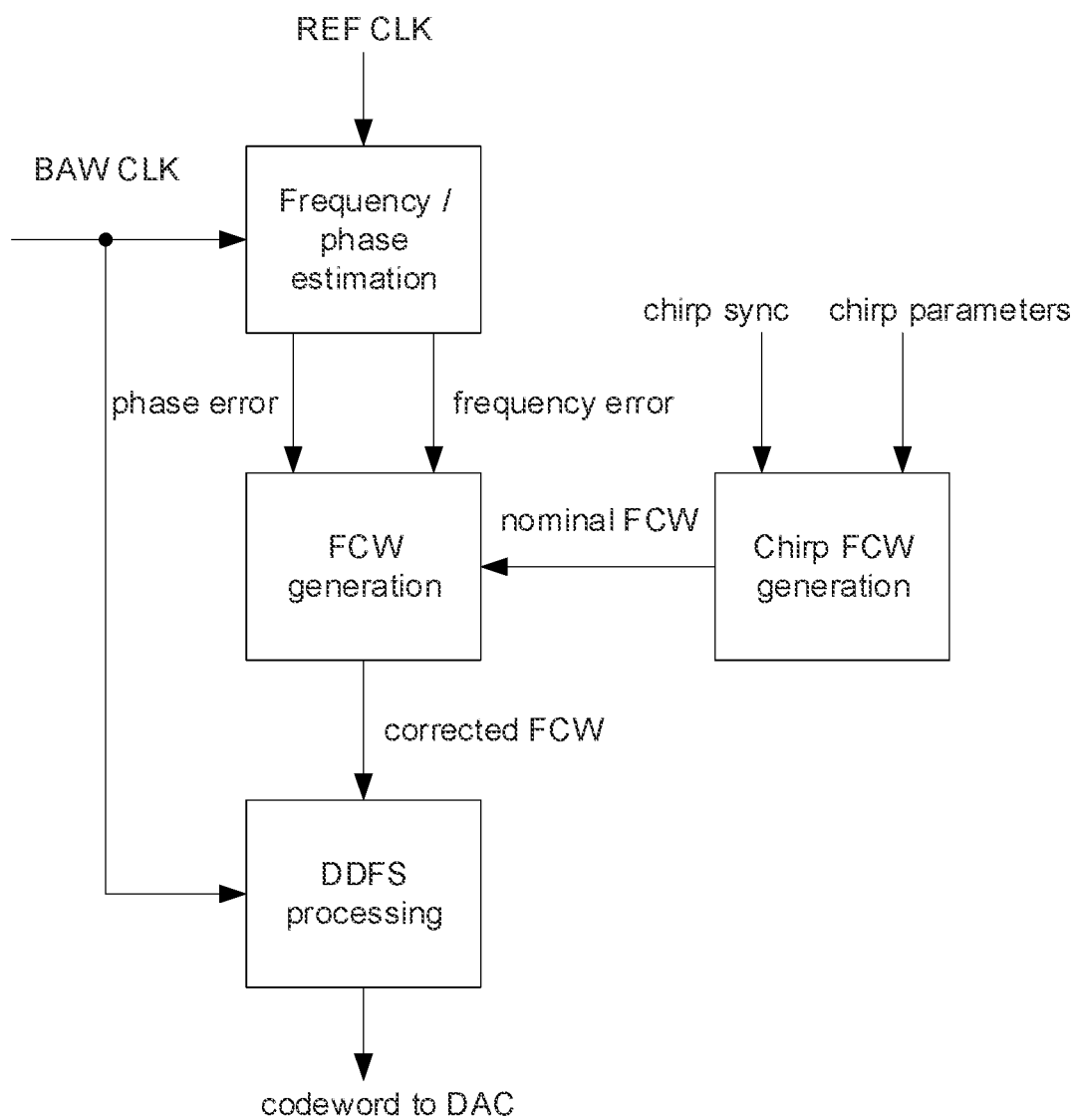
FIG. 4 illustrates a process for FMCW generation in accordance with an embodiment of the invention.

A process for FMCW generation in accordance with an embodiment of the invention is illustrated in FIG. 4. In many embodiments, a frequency control word (FCW) can be generated according to the chirp parameters specified by a user. Frequency and phase errors can be added to compensate for frequency and phase differences between a REF CLK and a BAW CLK from a BAW oscillator. As illustrated in FIG. 4, the frequency/phase estimation circuit can obtain a REF CLK and a BAW CLK and generate a phase error and a frequency error that is provided to an FCW generation circuit. The FCW generation circuit can obtain a nominal FCW from a chirp FCW generation circuit that uses a chirp sync signal and chirp parameters to generate the nominal FCW signal. The FCW generation circuit can generate a corrected FCW that is provided to a DDFS processing circuit. The DDFS processing circuit can generate a codeword that is provided to a HS DAC. Although a specific process is illustrated in FIG. 4, any of a variety of processes can be utilized for FMCW generation as appropriate to the requirements of a specific application in accordance with an embodiment of the invention.

In many embodiments, an FMCW architecture can offer several advantages over analog PLL implementations including perfectly linear frequency modulation (digital implementation), ultra-low phase noise (set by the quality of resonator), and very fast frequency modulation rate.

Frequency Diversity with Hopping Generation

In many embodiments of the system, frequency diversity can be used for interference mitigation in different applications, including radar applications. Frequency hopping is an implementation of frequency diversity. In a frequency hopping system in accordance with many embodiments of the system, the output frequency can be changed from one frequency to another one controlled by a pseudo-random (PN) sequence.

A frequency hopping signal can be expressed by the following equation:

$$x(t)=\sin(2\pi f(t)t+\theta_0)$$

$$f(t)=f_{rand(n)}, t_{n-1} \leq t < t_n, n \in [1, \ldots, N]$$

Where:

$f_1, \ldots, f_N$: list of frequencies used in the frequency hopping system $t_1, \ldots, t_N$: frequency hopping time rand(n): random frequency mapping in the frequency hopping system $\theta_0$: initial phase of the sine wave.

In many embodiments, a frequency hopping signal can be synthesized digitally and a digital codeword $x_n$ can be converted to an analog signal through a high-speed digital-to-analog converter (HS DAC).

The relationship between x(t) and $x_n$ is given by the following equation:

$$x_n = x(t=nT_s) = \sin(2\pi f(t)nT_s+\theta_0) = \sin(2\pi f_c(t)n+\theta_0)$$

$$f_c(t)=f_{rand(n)}T_s, t_{n-1} \leq t < t_n, n \in [1, \ldots, N]$$

$T_s$: sample period of the DAC clock.

If the sample clock is non-stationary, the digital codeword $x_n$, may need to be adjusted so the output frequency stays at the desired frequency. This adjustment can be illustrated by the following equation:

$$x_n' = x(t=nT_s') = \sin(2\pi f(t)nT_s'+\theta_0) = \sin(2\pi(f_c(t)+\Delta f_c(t))n+\theta_0)$$

$T_s'$: non-stationary sample period of the DAC clock ($T_s' = T_s + \Delta T_s$).

$\Delta f_c(t)$: frequency control word error ($\Delta f_c(t) = f_c(t)*\Delta T_s/T_s$).

Figure 5:
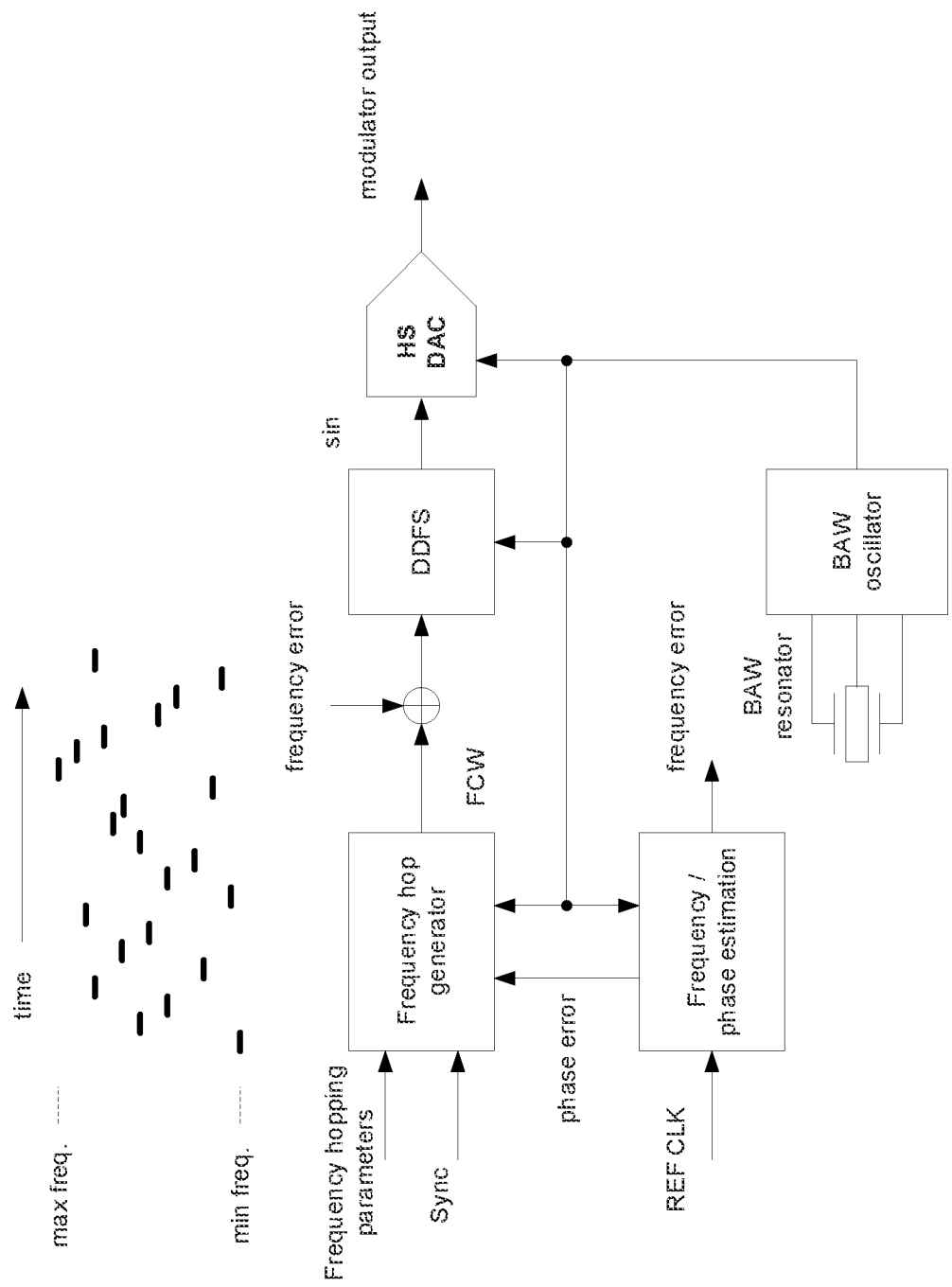
FIG. 5 illustrates a circuit diagram of a frequency hopping generator in accordance with an embodiment of the invention.
Figure 6:
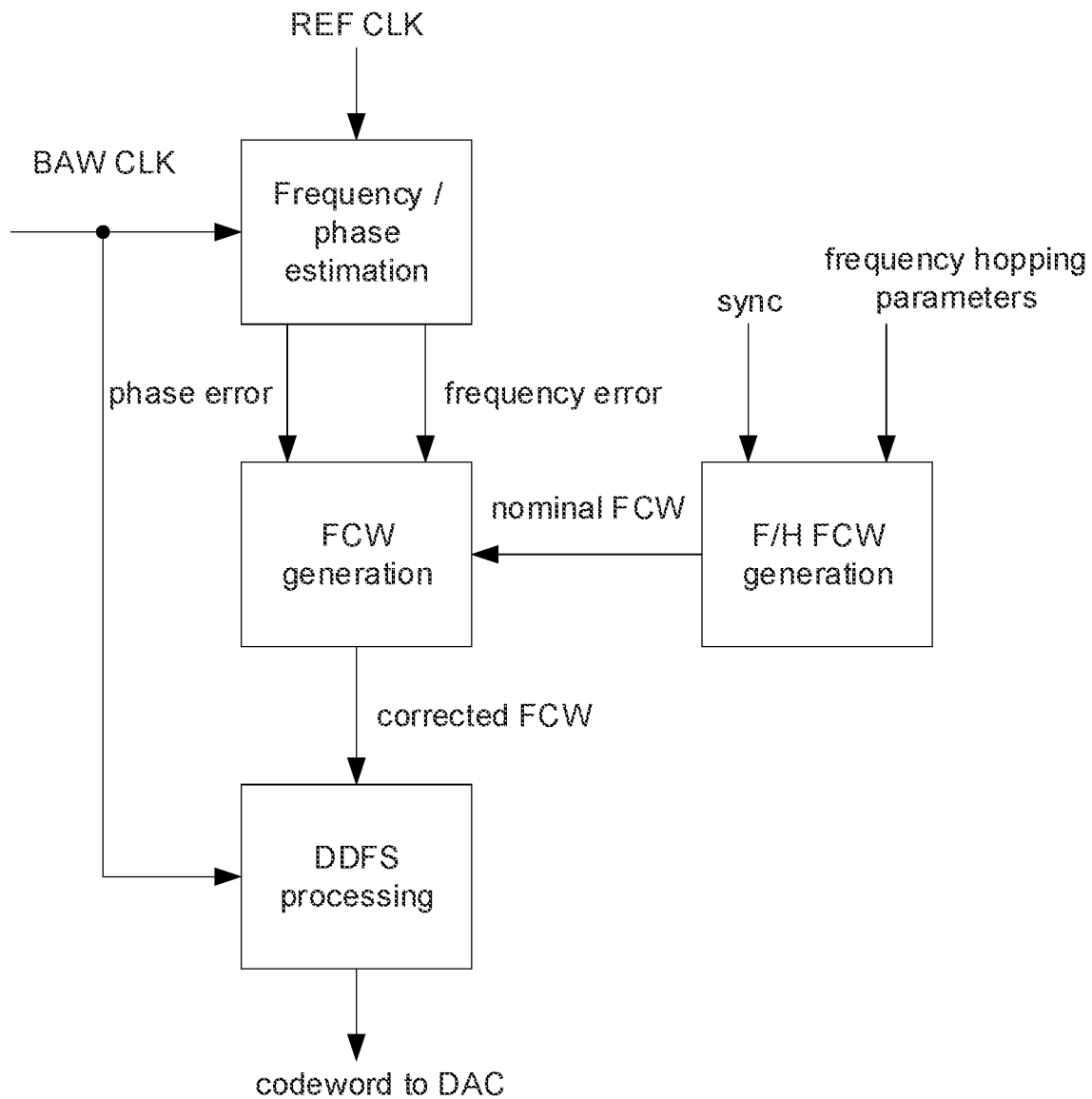
FIG. 6 illustrates a process for frequency hopping generation in accordance with an embodiment of the invention.

A frequency hopping generator circuit in accordance with an embodiment of the invention is shown in FIG. 5. The frequency hopping generator circuit can include a frequency/phase estimation circuit that receives a REF CLK, a BAW CLK from a BAW oscillator and generates a phase error and a frequency error, a frequency hop generator that receives frequency hopping parameters an a sync signal and generates a nominal frequency control word (FCW), an adder that combines the nominal FCW with the frequency error and the phase error to generate a corrected FCW and provides it to a DDFS, the DDFS can output a codeword to an HS DAC. Although FIG. 5 illustrates a particular circuit architecture for a frequency hopping generator, any of a variety of circuit architectures can be utilized as appropriate to the requirements of a specific application in accordance with an embodiment of the invention. A process for frequency hopping generation in accordance with an embodiment of the invention is illustrated in FIG. 6.

In many embodiments, FCW generation can be controlled by a PN sequence. As illustrated in FIG. 6, the frequency/phase estimation circuit can receive a REF CLK and a BAW CLK and generate a phase error and a frequency error that is provided to an FCW generation circuit. An F/H FCW generation circuit can receive a sync signal and a frequency hopping parameters and generate a nominal FCW signal that is provided to the FCW generation circuit. The FCW generation circuit can generate a corrected FCW that is provided to a DDFS processing circuit. The DDFS processing circuit can receive the corrected FCW and the BAW CLK and can output a codeword to a HS DAC. Although a specific process is illustrated in FIG. 6, any of a variety of processes can be utilized for frequency hopping generation as appropriate to the requirements of a specific application in accordance with an embodiment of the invention. The digital synthesis architecture in accordance with many embodiments of the invention can offers several advantages over analog implementations, including instantaneous frequency change without the unknown frequency settling in PLL, and ultra-low phase noise (set by the quality of resonator).

Code-modulated Continuous Wave Generation (CMCW)

In many embodiments, code-modulated continuous wave (CMCW) generation systems can modulate a high frequency continuous wave with a wide-band code sequence.

In many embodiments, a digital CMCW generator can be used to generate digital codeword $x_n$. $x_n$ can be converted to an analog signal through a high-speed digital-to-analog converter (HS DAC). $x_n$ corresponds to the desired analog signal at $t=nT_s$ where $T_s$ is the period of the sample clock. For a non-stationary sample clock where the sample time happens at $t'=nT_s'$ or $(nT_s+\Delta T_s)$, the digital codeword may need to be adjusted and the new codeword $x_n'$ can be calculated by a variable-interpolator-decimator (VID). An example of linear VID can be shown by the following equation:

$$x_n' = x(t=nT_s') = x(t=nT_s+\Delta T_s) = \begin{cases} x_n \frac{1-\Delta T_s}{T_s} + x_{n+1} \frac{\Delta T_s}{T_s}, & \Delta T_s \geq 0 \\ x_n \frac{1+\Delta T_s}{T_s} - x_{n-1} \frac{\Delta T_s}{T_s}, & \Delta T_s < 0 \end{cases}$$

For all VID filters, codeword $x_n'$ can be calculated as follows:

$$x_n' = x(t=nT_s') = x(t=nT_s+\Delta T_s) = \sum_{i=-L}^{L} h(i)*x_{n+i}$$

h(i): VID filter coefficients.

Figure 7:
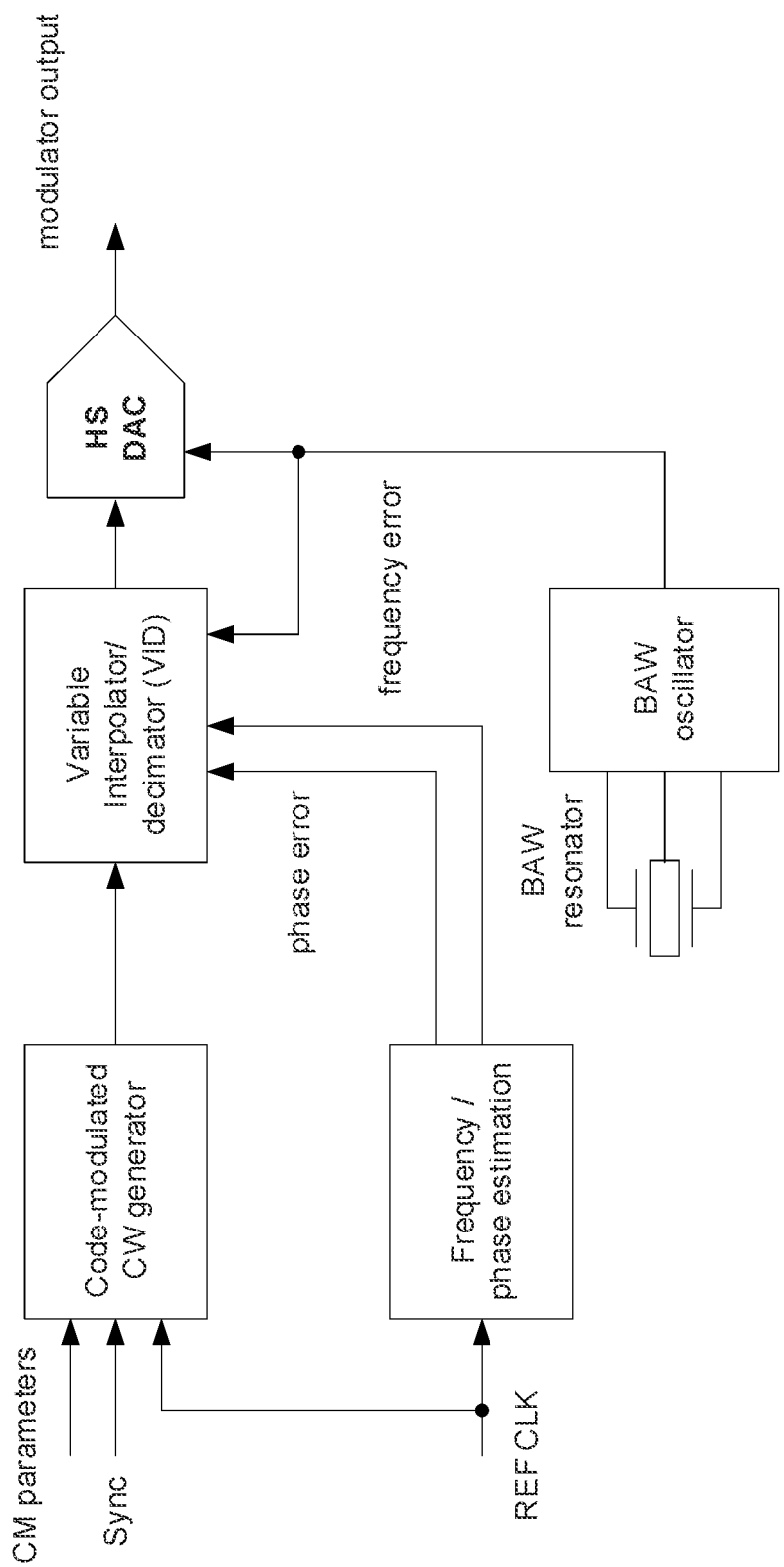
FIG. 7 illustrates a circuit diagram of a code-modulated continuous wave (CMCW) generator in accordance with an embodiment of the invention.

A circuit architecture of a CMCW generator in accordance with an embodiment of the invention is illustrated in FIG. 7. The CMCW circuit can include a frequency/phase estimation circuit that can receive a REF CLK signal and generate the phase error and the frequency error. A CMCW generator can receive CM parameters, a sync signal, and the REF CLK signal and provide a codeword to a variable interpolator/decimator (VID). The VID can receive the phase error, frequency error from a frequency/phase estimation circuit, the codeword from the CMCW generator, and a BAW CLK signal from a BAW oscillator and generated a corrected codeword to the HS DAS. The HS DAC can generate a modulator output. Although FIG. 7 illustrates a particular circuit architecture for a code-modulated CW generator, any of a variety of circuit architectures can be utilized as appropriate to the requirements of a specific application in accordance with various embodiments of the invention.

Figure 8:
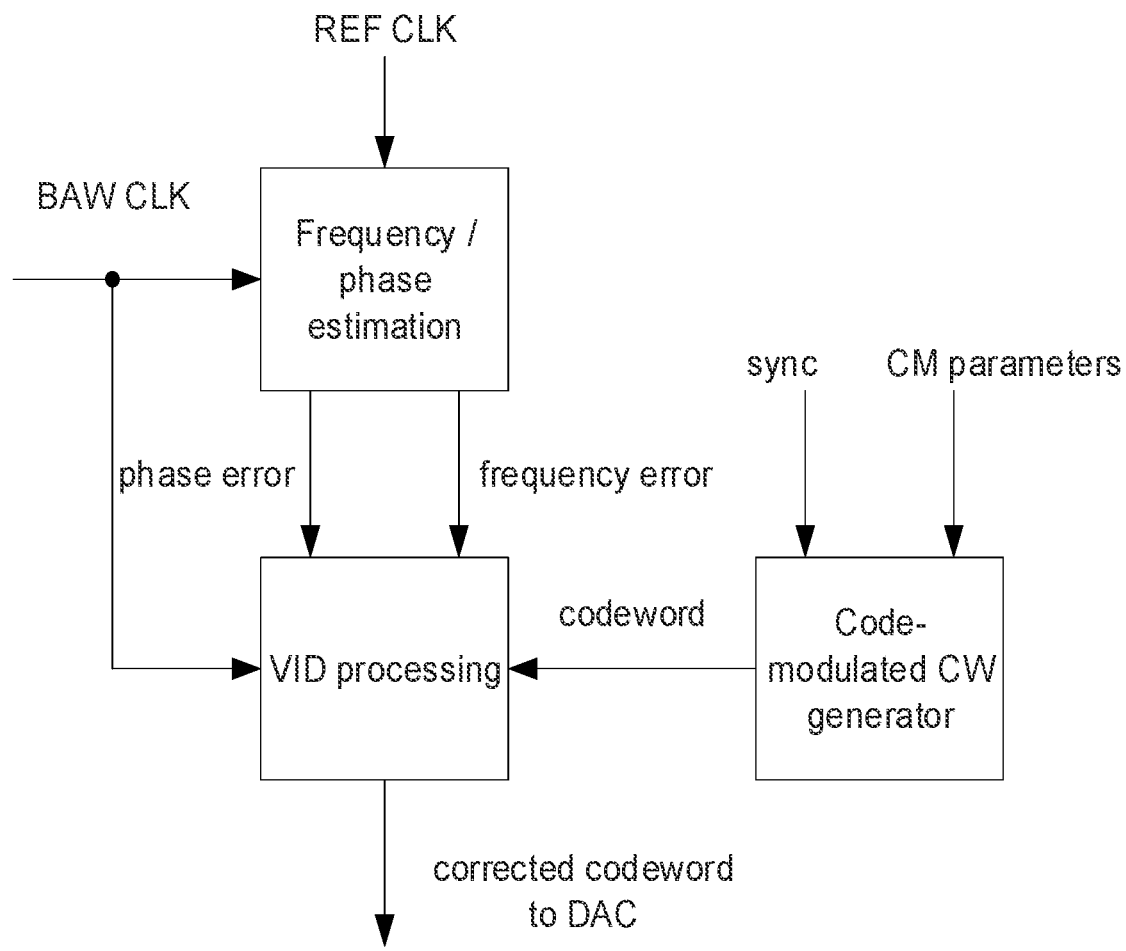
FIG. 8 illustrates a process for code-modulated continuous wave generation in accordance with an embodiment of the invention.

A process for code-modulated CW generation in accordance with an embodiment of the invention is illustrated in FIG. 8. In many embodiments, the modulated signal can be first generated in the REF CLK domain and re-sampled into the BAW CLK domain through a variable interpolator-decimator (VID). As illustrated in FIG. 8, the frequency/phase estimation circuit can receive a REF CLK and a BAW CLK and generate a phase error and a frequency error that is provided to a VID processing circuit. A code-modulated CW generator can receive a sync signal and CM parameters and generate a codeword that is provided to the VID processing circuit. The VID processing circuit can generate a corrected codeword that is provided to a DAC. Although a specific process is illustrated in FIG. 8, any of a variety of processes can be utilized for code-modulated CW generation as appropriate to the requirements of a specific application in accordance with various embodiments of the invention.

The code-modulated CW digital synthesis architecture can offer an advantage over analog implementations including providing ultra-low phase noise (set by the quality of resonator).

OFDM Generation

In many embodiments, an OFDM signal can include coded signals transmitted on multiple carrier frequencies (called subcarriers), continuously and in parallel. A digital OFDM modulator in accordance with several embodiments of the invention can be used to generate digital codeword $x_n$, which can be converted to an analog signal through a high-speed digital-to-analog converter (DAC). $x_n$ corresponds to the desired analog signal at $t=nT_s$ where $T_s$ is the period of the sample clock. For a non-stationary sample clock where the sample time happens at $t'=nT_s'$ or $(nT_s+\Delta T_s)$, the digital codeword may need to be adjusted and the new codeword $x_n'$ can be calculated by a variable-interpolator-decimator (VID) in accordance with many embodiments of the invention. An example of a linear VID in accordance with several embodiments of the invention can be shown by the following equation:

$$x_n' = x(t = nT_s') = x(t = nT_s + \Delta T_s) = \begin{cases} x_n \frac{1-\Delta T_s}{T_s} + x_{n+1}\frac{\Delta T_s}{T_s}, & \Delta T_s \geq 0 \\ x_n \frac{1+\Delta T_s}{T_s} - x_{n-1}\frac{\Delta T_s}{T_s}, & \Delta T_s < 0 \end{cases}$$

For all VID filters, codeword $x_n'$ can be calculated as follows:

$$x_n' = x(t = nT_s') = x(t = nT_s + \Delta T_s) = \sum_{i=-L}^{L} h(i) * x_{n+i}$$

h(i): VID filter coefficients.

Figure 9:
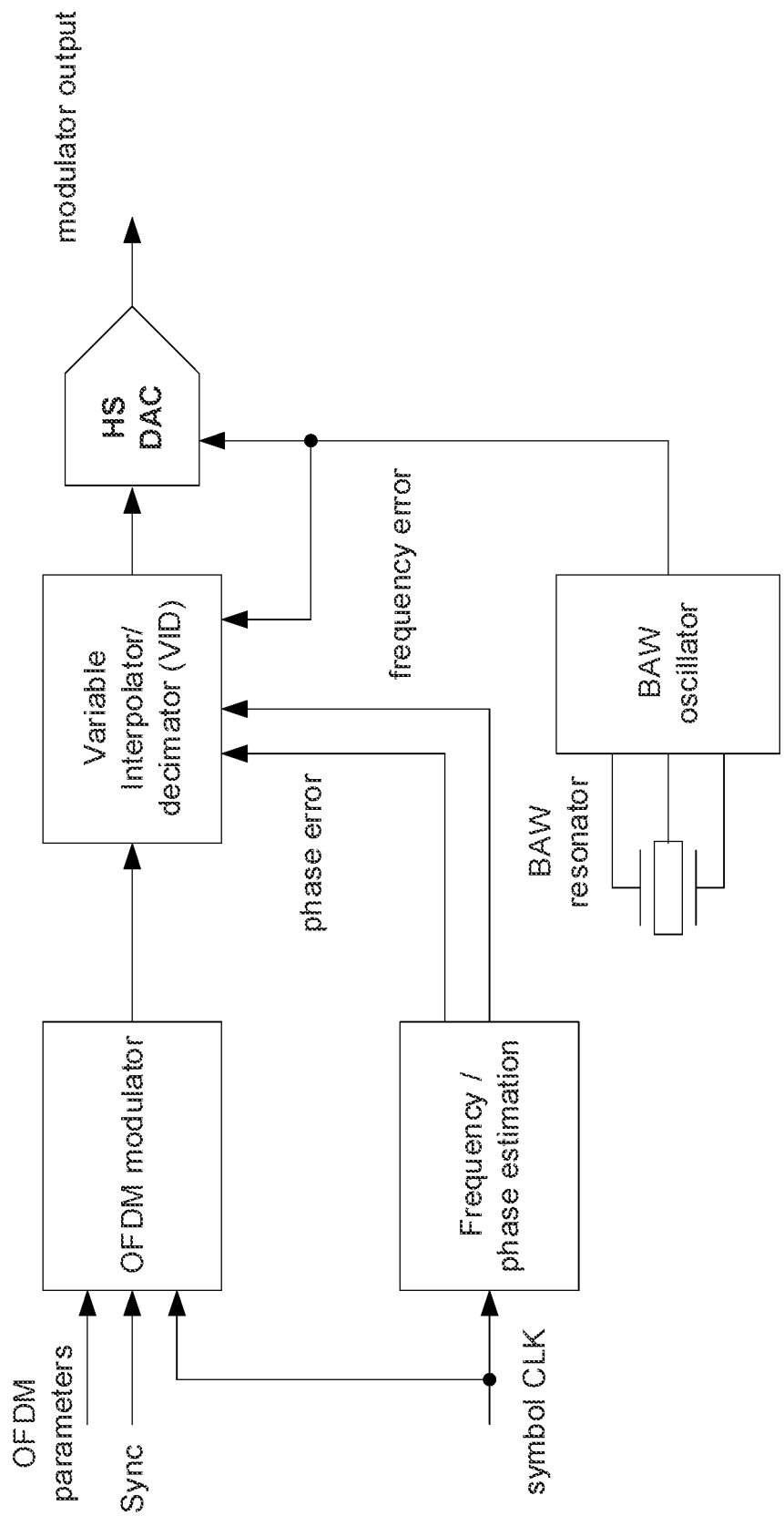
FIG. 9 illustrates a circuit diagram of an orthogonal frequency-division multiplexing (OFDM) generator in accordance with an embodiment of the invention.

An OFDM generator circuit architecture in accordance with an embodiment of the invention is illustrated in FIG. 9. The OFDM can include a frequency/phase estimation circuit that can receive a symbol CLK and generate the phase error and frequency error. The OFDM generator circuit architecture can include an OFDM modulator that receives OFDM parameters and a sync signal and generates a codeword that is provided to a variable interpolator/decimator (VID). THE VID can also receive signals representing the phase error and the frequency error from a frequency/phase estimation circuit, and a BAW CLK signal from a BAW oscillator. The VID can output a corrected codeword to an HS DAC. The HS DAC can also receive a BAW CLK from the BAW oscillator. THE HS DAC can generate a modulator output. Although FIG. 9 illustrates a particular circuit architecture for an OFDM generator, any of a variety of circuit architectures can be utilized as appropriate to the requirements of a specific application in accordance with various embodiments of the invention.

Figure 10:
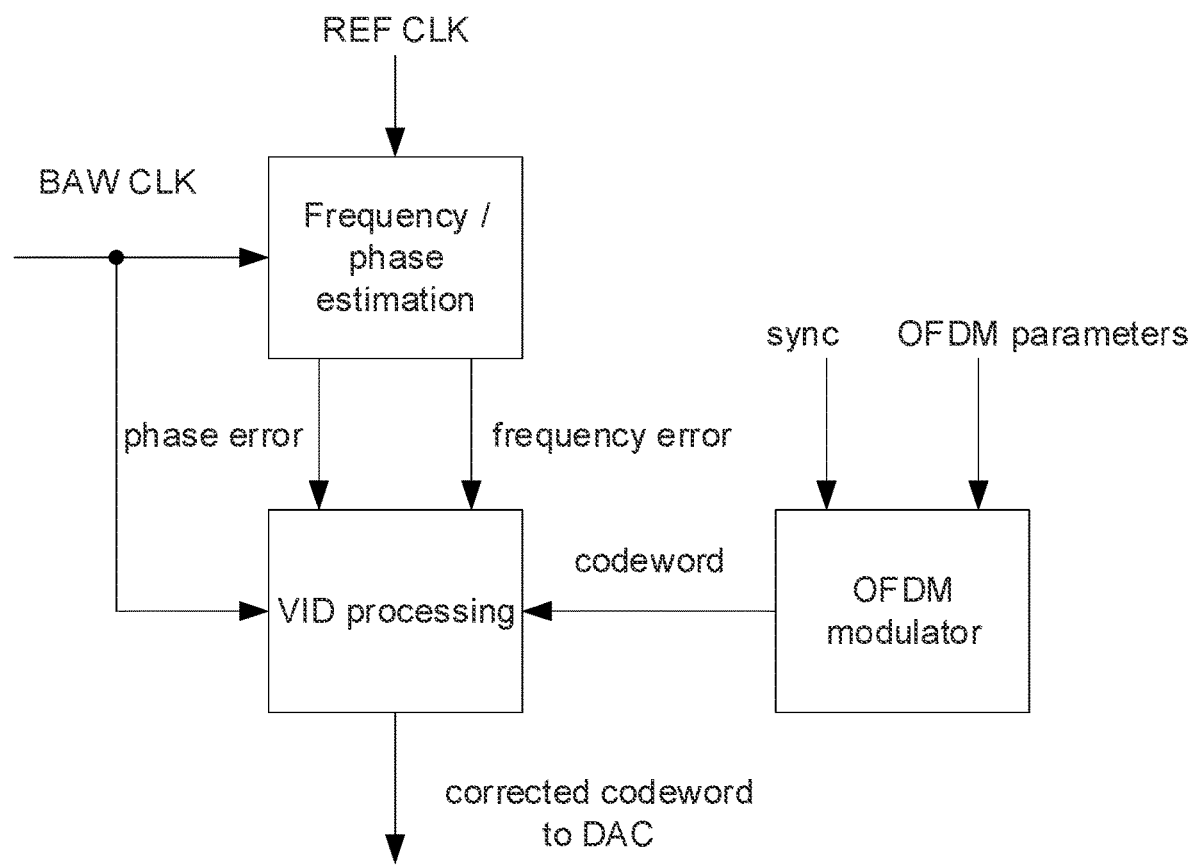
FIG. 10 illustrates a process for OFDM generation in accordance with an embodiment of the invention.

A process for OFDM generation in accordance with an embodiment of the invention is illustrated in FIG. 10. In many embodiments, the modulated signal can be first generated in the OFDM symbol clock domain and re-sampled into the BAW clock domain through a variable interpolator-decimator (VID). As illustrated in FIG. 10, the frequency/phase estimation circuit can receive a REF CLK and a BAW CLK and generate a phase error and a frequency error that is provided to a VID processing circuit. An OFDM modulator can receive a sync signal and OFDM parameters and generate a codeword that is provided to the VID processing circuit. The VID processing circuit can generate a corrected codeword that is provided to a DAC. Although a specific process is illustrated in FIG. 10, any of a variety of processes can be utilized for OFDM generation as appropriate to the requirements of a specific application in accordance with various embodiments of the invention.

The OFDM digital synthesis architecture in accordance with many embodiments of the invention can offer advantages over the analog implementations including providing for ultra-low phase noise (set by the quality of resonator).

Although the present invention has been described in certain specific aspects, many additional modifications and variations would be apparent to those skilled in the art. It is therefore to be understood that the present invention may be practiced otherwise than specifically described, including various changes in the implementation. Thus, embodiments of the present invention should be considered in all respects as illustrative and not restrictive.

What is claimed is:

1. A direct frequency synthesizer comprising:
a high speed bulk acoustic wave (BAW) resonator configured to generate a frequency signal;
a BAW oscillator capable of receiving the frequency signal and configured to generate an output BAW clock signal (BAW CLK);
a frequency and phase estimation circuit capable of receiving a reference clock signal from a reference clock (REF CLK) and the BAW CLK, where the frequency and phase estimation circuit is configured to generate a frequency error signal and a phase error signal;
a frequency chirp generator capable of receiving chirp parameters, and a chirp sync signal, where the frequency chirp generator is configured to generate a sequence of nominal frequency control word (FCW);
a frequency control word (FCW) generator that is capable of receiving an input FCW from the frequency chirp generator, and the phase error signal and the frequency error signal from the frequency and phase estimation circuit, where the FCW generator is configured to generate a corrected FCW based upon the input FCW, the phase error signal and the frequency error signal;

a direct digital frequency synthesizer capable of receiving the BAW CLK and the corrected FCW, where the direct digital frequency synthesizer is configured to generate a codeword based upon the BAW CLK and the corrected FCW; and a high speed digital to analog converter (HS DAC) capable of receiving the BAW CLK and the codeword, where the HS DAC is configured to synthesize an analog signal.

2. The direct frequency synthesizer of claim 1, wherein the analog signal transmitted is a continuous wave that varies up and down in frequency over a fixed period by a modulated signal.

3. The direct frequency synthesizer of claim 1, wherein the input FCW is generated according to chirp parameters specified by a user.

4. The direct frequency synthesizer of claim 1, wherein the frequency errors and phase errors are added to compensate for frequency and phase differences between the REF CLK and the BAW oscillator.

5. The direct frequency synthesizer of claim 1, wherein the analog signal is be specified in the following equation:

$$x(t) = \sin\left(2\pi\left(f_0 + \frac{\alpha}{2}t\right)t + \theta_0\right)$$

wherein:
$f_0$: initial frequency of a chirp signal
$\alpha$: frequency ramp rate of the chirp signal
$\theta_0$: initial phase of the chirp signal
wherein the chirp signal is generated digitally and converted to the analog signal with the high speed digital to analog converter (HS DAC), wherein a digital codeword $x_n$ can be specified in the following equation:

$$x_n = x(t = nT_s) = \sin(\theta_n)$$

$$\theta_n = \begin{cases} \theta_0, n = 0 \\ \theta_{n-1} + 2\pi f_{n-1} + \pi\alpha T_s^2, n > 0 \end{cases}$$

$$f_n = \begin{cases} f_0 T_s, n = 0 \\ f_{n-1} + \alpha T_s^2, n > 0 \end{cases}$$

wherein:
$T_s$: sample period of a HS DAC clock
$f_n$: frequency at time $t=nT_s$
wherein, for non-stationary sample clock, digital codeword $x_n$ can be adjusted as follows:

$$x'_n = x(t = nT'_s) = \sin(\theta'_n)$$

$$\theta'_n = \begin{cases} \theta_0, n = 0 \\ \theta'_{n-1} + 2\pi f'_{n-1} + \pi\alpha(T_s + \Delta T_s)^2, n > 0 \end{cases}$$

$$f'_n = \begin{cases} f_0(T_s + \Delta T_s), n = 0 \\ f'_{n-1} + \alpha(T_s + \Delta T_s)^2, n > 0 \end{cases}$$

wherein:
$T_s'$: non-stationary sample period of the HS DAC clock ($T_s' = T_s + \Delta T_s$).

6. A direct frequency synthesizer comprising:
a high speed bulk acoustic wave (BAW) resonator configured to generate a frequency signal;

a BAW oscillator capable of receiving the frequency signal and configured to generate an output BAW clock signal (BAW CLK);

a frequency and phase estimation circuit capable of receiving a reference clock signal from a reference clock (REF CLK) and the BAW CLK, where the frequency and phase estimation circuit is configured to generate a frequency error signal and a phase error signal;

a frequency hop frequency control word generator capable of receiving frequency hopping parameters, a sync signal, where the frequency hop frequency control word generator is configured to generate a sequence of nominal frequency control word (FCW);

a frequency control word (FCW) generator that is capable of receiving an input FCW from the frequency hop frequency control word generator, and the frequency error signal and the phase error signal from the frequency and phase estimation circuit, wherein the frequency control word generator is configured to generate a corrected FCW based upon the input FCW, the frequency error signal, and the phase error signal;

a direct digital frequency synthesizer capable of receiving the BAW CLK and the corrected FCW, where the direct digital frequency synthesizer is configured to generate a codeword based upon the BAW CLK and the corrected FCW; and a high speed digital to analog converter (HS DAC) capable of receiving the BAW CLK and the codeword, wherein the HS DAC is configured to output an analog signal.

7. The direct frequency synthesizer of claim 6, wherein an output frequency is changed from one frequency to another one controlled by a pseudo-random (PN) sequence.

8. The direct frequency synthesizer of claim 6, wherein a frequency hopping signal is expressed by the following equation:

$$x(t) = \sin(2\pi f(t)t + \theta_0)$$

$$f(t) = f_{rand(n)}, t_{n-1} \leq t < t_n, n \in [1, \ldots, N]$$

wherein:
$f_1, \ldots, f_N$: list of frequencies used in a frequency hopping system
$t_1, \ldots, t_N$: frequency hopping time
rand(n): random frequency mapping in the frequency hopping system
$\theta_0$: initial phase of a sine wave
wherein:
the frequency hopping signal is synthesized digitally and digital codeword $x_n$ is converted to the analog signal through the high speed digital to analog converter (HS DAC);
wherein:
the relationship between $x(t)$ and $x_n$ is given by the following equation:

$$x_n = x(t = nT_s) = \sin(2\pi f(t) nT_s + \theta_0) = \sin(2\pi f_c(t) n + \theta_0)$$

$$f_c(t) = f_{rand(n)} T_s, t_{n-1} \leq t < t_n, n \in [1, \ldots, N]$$

wherein:
$T_s$: sample period of a HS DAC clock
wherein, if a sample clock is non-stationary, the digital codeword $x_n$ is adjusted so an output frequency stays at a desired frequency by the following equation:

$$x_n' = x(t = nT_s') = \sin(2\pi f(t) nT_s' + \theta_0) = \sin(2\pi (f_c(t) + \Delta f_c(t)) n + \theta_0)$$

wherein:

$T_s$: non-stationary sample period of the HS DAC clock ($T_s'=T_s+\Delta T_s$)

$\Delta f_c(t)$: frequency control word error ($\Delta f_c(t)=f_c(t)*\Delta T_s/T_s$).

9. A direct frequency synthesizer comprising:
- a high speed bulk acoustic wave (BAW) resonator configured to generate a frequency signal;
- a BAW oscillator capable of receiving the frequency signal, where the BAW oscillator is configured to generate an output BAW clock signal (BAW CLK);
- a frequency and phase estimation circuit capable of receiving a reference clock signal from a reference clock (REF CLK) and the BAW CLK, where the frequency and phase estimation circuit is configured to generate a frequency error signal and a phase error signal;
- a code-modulated continuous wave (CMCW) generator capable of receiving CM parameters and a sync signal, where the CMCW generator is configured to generate a codeword;
- a variable interpolator/decimator (VID) capable of receiving the codeword from the CMCW generator, the phase error signal and the frequency error signal from the frequency and phase estimation circuit and the BAW CLK signal from the BAW oscillator, where the VID is configured to generate a corrected codeword; and
- a high speed digital to analog converter (HS DAC) capable of receiving the BAW CLK and the corrected codeword, where the HS DAC is configured to output an analog signal.

10. The direct frequency synthesizer of claim 9, wherein the CMCW generator modulates a high frequency continuous wave with a wide-band code sequence.

11. The direct frequency synthesizer of claim 9, wherein the codeword is a digital codeword $x_n$;

wherein $x_n$ is converted to the analog signal through the high speed digital to analog converter (HS DAC);

wherein $x_n$ corresponds to a desired analog signal at $t=nT_s$ where $T_s$ is a period of a sample clock;

wherein, for a non-stationary sample clock where a sample time happens at $t'=nT_s'$ or $(nT_s+\Delta T_s)$, the digital codeword is adjusted and the corrected codeword $x_n'$ is calculated by the variable interpolator/decimator (VID) by the following equation:

$$x_n' = x(t=nT_s') = x(t=nT_s+\Delta T_s) = \begin{cases} x_n \dfrac{1-\Delta T_s}{T_s} + x_{n+1} \dfrac{\Delta T_s}{T_s}, & \Delta T_s \geq 0 \\ x_n \dfrac{1+\Delta T_s}{T_s} - x_{n-1} \dfrac{\Delta T_s}{T_s}, & \Delta T_s < 0 \end{cases}$$

wherein for all VID filters, codeword $x_n'$ can be calculated as follows:

$$x_n' = x(t=nT_s') = x(t=nT_s+\Delta T_s) = \sum_{i=-L}^{L} h(i)*x_{n+i}$$

wherein $h(i)$: VID filter coefficients.

12. A direct frequency synthesizer comprising:
- a high speed bulk acoustic wave (BAW) resonator configured to generate a frequency signal;
- a BAW oscillator capable of receiving the frequency signal, where the BAW oscillator is configured to generate an output BAW clock signal (BAW CLK);
- a frequency and phase estimation circuit capable of receiving a reference clock signal from a reference clock (REF CLK) and the BAW CLK from the BAW oscillator, where the frequency and phase estimation circuit is configured to generate a frequency error signal and a phase error signal;
- an orthogonal frequency-division multiplexing (OFDM) generator that is capable of receiving OFDM modulation parameters and a sync signal, where the OFDM generator is configured to generate a codeword;
- a variable interpolator/decimator (VID) that is capable of receiving the codeword from the OFDM generator, the phase error signal and the frequency error signal from the frequency and phase estimation circuit, and the BAW CLK from the BAW oscillator, where the VID is configured to generate a corrected codeword; and
- a high speed digital to analog converter (HS DAC) that is capable of receiving the BAW CLK from the BAW oscillator and the corrected codeword from the VID, where the HS DAC is configured to output an analog signal.

13. The direct frequency synthesizer of claim 12, wherein an OFDM signal includes coded signals transmitted on multiple carriers continuously and in parallel.

14. The direct frequency synthesizer of claim 12, wherein the codeword is a digital codeword $x_n$;

wherein $x_n$ is converted to the analog signal through the high speed digital to analog converter (HS DAC);

wherein $x_n$ corresponds to a desired analog signal at $t=nT_s$ where $T_s$ is a period of a sample clock;

wherein, for a non-stationary sample clock where the sample time happens at $t'=nT_s'$ or $(nT_s+\Delta T_s)$, the digital codeword is adjusted and the corrected codeword $x_n'$ is calculated by the variable interpolator/decimator (VID) by the following equation:

$$x_n' = x(t=nT_s') = x(t=nT_s+\Delta T_s) = \begin{cases} x_n \dfrac{1-\Delta T_s}{T_s} + x_{n+1} \dfrac{\Delta T_s}{T_s}, & \Delta T_s \geq 0 \\ x_n \dfrac{1+\Delta T_s}{T_s} - x_{n-1} \dfrac{\Delta T_s}{T_s}, & \Delta T_s < 0 \end{cases}$$

wherein For all VID filters, codeword $x_n'$ can be calculated as follows:

$$x_n' = x(t=nT_s') = x(t=nT_s+\Delta T_s) = \sum_{i=-L}^{L} h(i)*x_{n+i}$$

wherein $h(i)$: VID filter coefficients.

* * * * *